Figure 3:
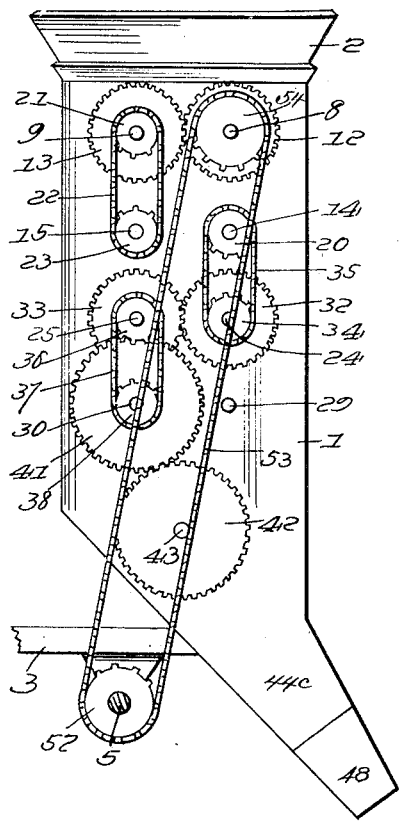

J. A. HERRON.
DISINTEGRATOR.
APPLICATION FILED MAR. 9, 1921.
1,392,054.
Patented Sept. 27, 1921.
2 SHEETS—SHEET 1.
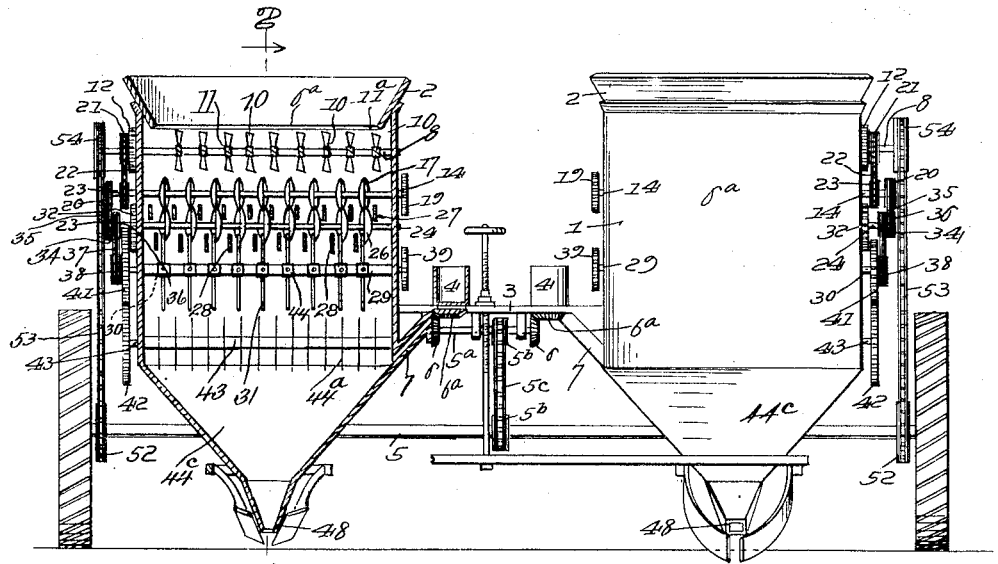
Fig. 1.
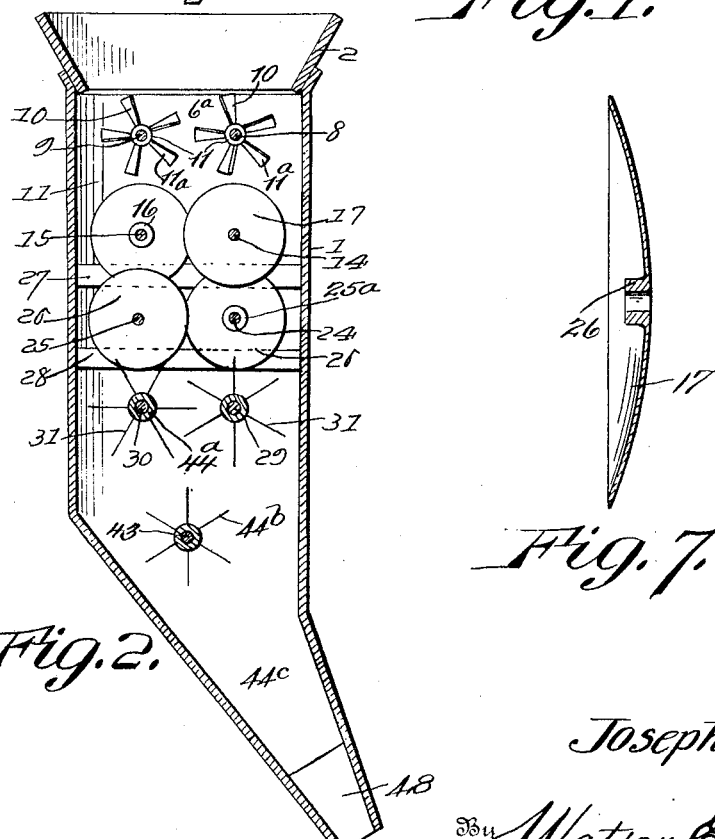
Fig. 2.
Fig. 7.
Inventor
Joseph A. Herron,
By Watson E. Coleman
Attorney

J. A. HERRON.
DISINTEGRATOR.
APPLICATION FILED MAR. 9, 1921.

1,392,054.

Patented Sept. 27, 1921.
2 SHEETS—SHEET 2.

Inventor
Joseph A. Herron,
By Watson E. Coleman
Attorney under it all.
UNITED STATES PATENT OFFICE.

JOSEPH A. HERRON, OF CONCORD, TENNESSEE.

DISINTEGRATOR.

1,392,054. Specification of Letters Patent. Patented Sept. 27, 1921.

Application filed March 9, 1921. Serial No. 450,872.

*To all whom it may concern:*

Be it known that I, JOSEPH A. HERRON, a citizen of the United States, residing at Concord, in the county of Knox and State of Tennessee, have invented certain new and useful Improvements in Disintegrators, of which the following is a specification, reference being had to the accompanying drawings.

This invention relates to an improved combined manure disintegrator or lister and planter and an object is to provide a machine of this character adapted for disintegrating and agitating the manure and feeding and distributing the same as well as seed to be planted into the soil.

Ordinarily manures are not soluble and hence the escape of ammonia and nitrogen before it becomes soluble, lowers the grade of the manure, and therefore it is not serviceable for grain or root growth.

Therefore, a primary object is to provide a machine of this design, especially adapted for carrying rough barnyard manure in soluble form adapted for plant life and its growth and to list the manure into the rows with grain or root growth and also to use the same in connection with seed planting for the purpose of covering the seed bed at one operation. Any vegetable growth that can be used for mulsh can be cut and distributed by this machine.

Another object is to provide a machine of this design which can be utilized for preparing waste manure from stables and barn yards and so treating the manure as to make it soluble.

A further object is to provide a plurality of feeders for first feeding the manure into a hopper, and then passing the manure on to combined feeders and cutters or disintegrators, which coöperate with transverse cutter bars, thereby so preparing the manure before it is fed through an outlet chute as to prevent the same from packing or clogging up the chute.

A still further object is to provide a machine of this character wherein the manure after it is so prepared feeds through an outlet chute by gravity and in such wise as to prevent the same from packing or clogging up, and when the material is discharged, the seed is discharged with it and actuates to thoroughly cover the seed so as to facilitate plant life.

Additionally the invention aims to provide means for so connecting the various disintegrating feeders and cutters, as they may be termed, as to operate them in unison and in conjunction with the final discharging means.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 4:
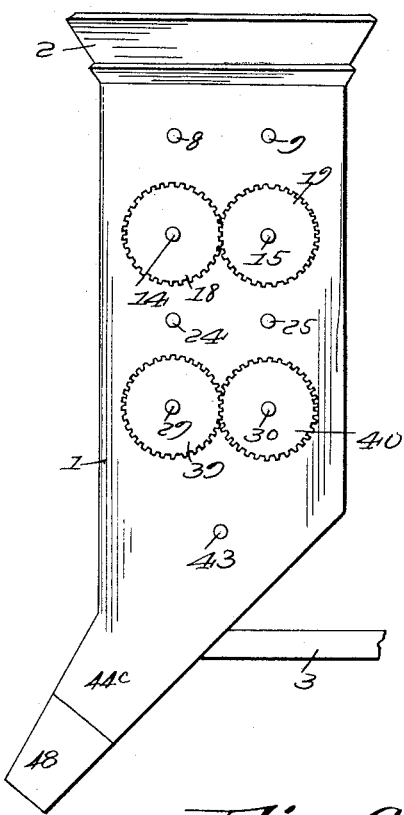
Figure 5:
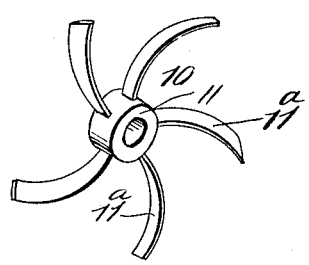
Figure 6:
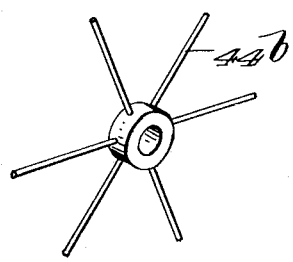

In the drawings:

Figure 1 is a vertical sectional view of the improved machine constructed in accordance with the invention and showing the feed receptacles and the operating means therefor and illustrating the various disintegrator feeder members and cutters and their gear connections with the main drive shaft which in turn operates the drop feed of the feed receptacle, Fig. 2 is a sectional view on line 2—2 of Fig. 1, Fig. 3 is a side view showing the gear connections between the various shafts of the feeders, separators or disintegrators, Fig. 4 is a view showing the opposite side of the casing showing other gearing of the shafts, Fig. 5 is a perspective view of one of the feeder wheels or members 10, Fig. 6 is a detail perspective view of one of the scrapers 31, Fig. 7 is a sectional view through one of the cutting disks 17 or 26 which also actuates to partially feed the material through the machine at the same time that it is cut.

Referring to the drawings, 1 designates a casing which has a hopper 2 and which is supported upon a suitable planter frame 3. Carried by the planter frame are seed receptacles 4 from which the seed may be fed by means of a conventional form of drop feed mechanism (not shown). However, a shaft 5 is mounted in the frame 3 and is provided with sprocket chain and sprocket gear connections 5$^c$ and 5$^b$ with the shaft 5$^a$ which carries the gears 6 meshing with the gears 6ª of the drop feed mechanism on the inside of the receptacles.

In the drawings there is disclosed a pair of manure receiving chambers 6ª with the disintegrating mechanism therein, and it will be noted that the lower end of each chamber has a communicative connection 7 with its respective seed receptacle so that when the manure is discharged, the seed passes out with it.

Mounted in the upper part of the wall of the casing or chamber is a pair of shafts 8 and 9 and mounted thereon are beaters or feeders 10. These feeders which also act as disintegrators comprise the sleeves 11 and the arms 11ª. The shafts 8 and 9 carry intermeshing gears 12 and 13 so that the shafts 8 and 9 will rotate downwardly and toward each other to insure feeding the material downwardly through the casing or chamber. The sleeves 11 of the feeders 10 move with the shafts 8 and 9. The arms 11ª of the feeders 10 are curved in the direction of rotation as the sleeves rotate downwardly and toward each other. The arms of one sleeve are curved toward the arms of the other sleeve. By this construction it is obvious that the material is not only fed, but is also separated or disintegrated as it is fed through the casing or chamber and is therefore reduced to a very fine state.

Mounted in bearings of the casing is a pair of shafts 14 and 15 on which the hubs 16 of the cutting disks 17 are mounted and movable with the shaft. These shafts 14 and 15 also rotate downwardly and toward the other. The cutting disks are disposed upon the shafts so that their marginal portions overlap in order to provide a powerful cutting force which has been found to be advantageous in a machine of this character. The disks are of such curvature or arcuately shaped so that the convex portion will also act to feed the material. In other words, the concave surface and the convex surface will have a tendency to feed the material and the cutting edges will actuate to disintegrate and chop the material to a very fine state. The shafts 14 and 15 also have mounted thereon intermeshing gears 18 and 19. On one end of the shaft 14 is a sprocket 21. One end of the shaft 9 carries a sprocket 21 with which a chain 22 engages and which chain passes about the sprocket 23 which is carried by one end of the shaft 15. By the provision of the sprockets 21 and 23 and the sprocket chain 22 it will be noted that power is transmitted from the shaft 9 to the shaft 15 and thence to the shaft 14 through the medium of the gears 18 and 19.

Shafts 24 and 25 are mounted in bearings of the casing or frame and connected to the shaft are the hubs 25 of the cutting disks 26. These disks 26 are similar to the cutting disks 17 and coöperate with one another in a similar manner and act mainly to chop or cut the material and also to feed the manure or material through the chamber as well as acting as separators. It will be noted that the cutting disks 26 are arranged on the shafts 24 and 25 just the reverse to the arrangement of the disks 17 so that while the disks 26 are capable of overlapping each other, they are also capable of overlapping the cutting disks 17, and owing to this arrangement namely the sharp curved cutting edges overlapping, the material or manure can be more thoroughly cut and disintegrated.

Furthermore the lower set of disks overlapping the upper disks 17 act to scrape each other, thereby preventing clogging or sticking of the material on the disks.

Arranged transversely of the casing or chamber are upper and lower sets of bars 27 and 28. The upper bars 27 are arranged at a point substantially where the upper and lower cutting disks overlap, and coöperate with the disks in order to greatly facilitate the disintegrating of the material to a very fine state. The disintegrating bars 27 and 28 are arranged in planes in staggered relations and the lower sets of bars 28 are disposed in planes between the lower set of cutting disks, and also coöperate with the lower cutting disks in order to further disintegrate the material. The disintegrating and cutting of the manure by a machine of this character, causes the manure to be reduced to a very fine state in order that it may become soluble so that it may be used for plant life and for use as a fertilizer for the planting of seed.

Shafts 29 and 30 are mounted in bearings of the wall of the casing or chamber and mounted upon these shafts are sleeves 44ª and which rotate with the shafts. These sleeves 44ª have radial arms 31 which act primarily as scrapers, but it is obvious that they also act as beaters for the purpose of beating the manure or material as it leaves the cutting disks so as to further feed the material through the chamber. It will be noted that these arms 31 overlie the marginal sharp cutting curved edges of the lower set of cutting disks and engage therewith in order to scrape the material from the disks and thereby preventing the material sticking to the disks and clogging the machine with the moist manure. The disks rotate toward each other, as before stated, with the sharp cutting edges in direct contact, thereby rendering themselves self-sharpening. Carried by the shafts 24 and 25 are gears 32 and 33 which mesh with each other. A sprocket 34 is movable with the shaft 24 and carries a sprocket chain 35 engaging about the sprocket 20 of the shaft 14 whereby power is transmitted from the shaft 14 to the shaft 24 and thence to the shaft 25 through the gears 32 and 33. The shaft 25 on the end carries a sprocket 36 about which a chain 37 passes. This chain in turn passes about the sprocket 38 on one end of the shaft 30. The shafts 29 and 30 carry intermeshing gears 39 and 40 so that power may be transmitted from the shaft 30 to the shaft 29 in order to operate the scraper arms 31.

Also movable with the shaft 30 is a gear 41 which meshes with the gear 42 which is carried by a shaft 43. The shaft 43 extends transversely of the casing or chamber and is provided with a plurality of radial beater or feeder arms 44$^b$ to additionally feed the material into the outer chute 44$^c$.

As illustrated in Fig. 1 of the drawings, the main shaft 5 carries a sprocket 52 which is geared to the shaft 8 by the sprocket chain 53 and sprocket 54 so that power may be transmitted from the main shaft 5 to the series of shafts carrying the cutting disks, the feeders or disintegrators and the scrapers.

In the operation of the machine, the material is first placed in the hopper 2 where it is fed into the chamber below by the feeders and disintegrators 10. The manure or other material is then fed between the various cutting disks and between the disintegrating bars and subsequently between the additional disintegrating and feeder arms 31 and then discharged through the tapered parts 44$^c$ and 48 of the outlet chute through the medium of gravitation. As the material passes through the chute the seed from the seed receptacle mix therewith and is then used for plant life.

While there has been disclosed a certain form of gearing including gears, sprocket chains and the like, it is obvious that other gearing may be employed and furthermore it is obvious that the ratio of the operable gear connections may be varied according to the requirements that may arise in practice.

The invention having been set forth, what is claimed as new and useful is:—

1. In a machine as set forth, a casing having a chamber, a hopper therefor, a plurality of combined feeders and disintegrators arranged in a set adjacent the hopper, upper and lower sets of combined disintegrating and cutter bars mounted in the chamber, opposing revoluble cutting elements mounted in the chamber, said cutting elements having their sharp curved edges overlapping each other at points adjacent certain of the cutting and disintegrating bars, and a plurality of scrapers revolubly mounted below the cutting elements and in positions to scrape the cutting elements, said casing having an outlet chute.

2. In a machine as set forth, a casing having a chamber for the reception of material to be disintegrated and cut, upper and lower sets of stationary transverse cutting and disintegrating bars in the chamber, the bars of one set being in staggered relation to those of the other set, upper and lower sets of revoluble cutting members having overlapping curved cutting edges, certain of the overlapping cutting edges of the cutting members being adjacent the upper set of cutting and disintegrating bars, to facilitate the disintegrating of the material, and revoluble feeder members about the upper cutting members to feed the material to the cutting members, the casing having an outlet chute through which the disintegrator and cut material will gravitate, and operative gear connections between the various revoluble cutting and feeding elements, whereby the parts may operate in unison.

3. In a machine as set forth, a casing having a chamber for the reception of the material to be disintegrated, said chamber terminating at its lower end in an outlet chute, a hopper for the chamber, a plurality of disk cutting elements arranged in upper and lower sets and relatively positioned incident to the four corners of a rectangle, the upper set of disk cutting elements having overlapping sharpened edges, the lower set of disk cutting elements having overlapping sharpened edges, the disk cutting elements of the lower set having sharpened cutting edges overlapping the corresponding edges of the upper disk cutting elements, thereby acting to cut the material and preventing the material from adhering to the disks as well as keeping the disks self-sharpened, and a plurality of revoluble feeders having curved blade arms curved toward each other in the direction of rotation, said feeders being arranged in staggered relation to the upper set of disk cutting elements, and operative gear connections between the several revoluble members whereby the parts may operate in unison.

4. In a machine as set forth, a casing having a chamber for the reception of the material to be disintegrated, said chamber terminating at its lower end in an outlet chute, a hopper for the chamber, a plurality of disk cutting elements arranged in upper and lower sets and relatively positioned incident to the four corners of a rectangle, the upper set of disk cutting elements having overlapping sharpened edges, the lower set of disk cutting elements having overlapping sharpened edges, the disk cutting elements of the lower set having sharpened cutting edges overlapping the corresponding edges of the upper disk cutting elements, thereby acting to cut the material and preventing the material from adhering to the disks as well as keeping the disks self-sharpened, and a plurality of revoluble feeders having curved blade arms curved toward each other in the direction of rotation, said feeders being arranged in staggered relation to the upper set of disk cutting elements, a plurality of disintegrating cutting bars between the disk cutting elements adjacent the point where the lower disk cutting elements overlap the upper disk cutting elements, a second plurality of disintegrating cutting bars arranged in staggered relation to the lower set of disk cutting elements and in staggered relation to the first disintegrating cutting bars, a plurality of revoluble scrapers engaging the lower sharpened or cutting edges of the lower disk cutting elements, and operative gear connections between the various revoluble parts, whereby the parts may operate in unison.

In testimony whereof I hereunto affix my signature.

JOSEPH A. HERRON.